United States Patent
Douglas et al.

(10) Patent No.: US 10,080,414 B2
(45) Date of Patent: *Sep. 25, 2018

(54) MOTOR MOUNT

(71) Applicant: Dyson Technology Limited, Wiltshire (GB)

(72) Inventors: Craig Douglas, Swindon (GB); Antoine Francois Atkinson, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,848

(22) Filed: Jan. 14, 2016

(65) Prior Publication Data

US 2016/0206074 A1 Jul. 21, 2016

(30) Foreign Application Priority Data

Jan. 15, 2015 (GB) .................................. 1500656.2

(51) Int. Cl.
*A45D 20/12* (2006.01)
*F16M 13/02* (2006.01)
(Continued)

(52) U.S. Cl.
CPC .............. *A45D 20/12* (2013.01); *A45D 20/10* (2013.01); *F16M 13/02* (2013.01); *H02K 5/24* (2013.01)

(58) Field of Classification Search
CPC ........ A45D 20/12; A45D 20/10; F16M 13/02; H02K 5/24
(Continued)

(56) References Cited

U.S. PATENT DOCUMENTS 578,798 A 3/1897 Wheelwright et al.
2,687,137 A * 8/1954 Kramer .................. A47L 15/30
134/112
(Continued)

FOREIGN PATENT DOCUMENTS

EP 1 808 951 7/2007
EP 2 000 042 12/2008
(Continued)

OTHER PUBLICATIONS

Search Report dated Jun. 30, 2015, directed to GB Application No. 1500656.2; 1 page.

(Continued)

*Primary Examiner* — Stephen M Gravini
(74) *Attorney, Agent, or Firm* — Morrison & Foerster LLP

(57) ABSTRACT

A mount for an electric motor, the mount including a sleeve for receiving the motor, the sleeve including an annular seal extending around the sleeve and a recess extending around the circumference of the sleeve. The sleeve has a first end and a second end. The recess may be disposed adjacent the first end of the sleeve. The annular seal may be disposed at the first end and the recess next to the annular seal. The first end may be a downstream end of the mount. The recess may be an indentation extending circumferentially around sleeve. The recess may be provided on a radially outer surface of the sleeve. The recess may comprise first and second radial surfaces which are spaced apart when in an uncompressed state. The first and second surfaces are pressed together when in a compressed state.

14 Claims, 5 Drawing Sheets

(51) Int. Cl.
*A45D 20/10* (2006.01)
*H02K 5/24* (2006.01)

(58) Field of Classification Search
USPC .................................................... 34/97–99
See application file for complete search history.

(56) References Cited

U.S. PATENT DOCUMENTS

| | | | |
|---|---|---|---|
| 3,094,606 A | 6/1963 | Ferris | |
| 3,235,207 A * | 2/1966 | Church | H02K 5/24 |
| | | | 248/606 |
| 3,420,335 A * | 1/1969 | Dochterman | H02K 5/1675 |
| | | | 184/6.4 |
| 3,721,411 A * | 3/1973 | Cunningham | H02K 5/24 |
| | | | 248/606 |
| 4,300,280 A * | 11/1981 | Majthan | A45D 20/38 |
| | | | 219/546 |
| 4,350,872 A | 9/1982 | Meywald et al. | |
| 4,767,914 A | 8/1988 | Glucksman | |
| 4,800,309 A * | 1/1989 | Lakin | H02K 5/1672 |
| | | | 310/89 |
| 5,242,281 A | 9/1993 | Hartley et al. | |
| 5,406,154 A * | 4/1995 | Kawaguchi | B60L 7/10 |
| | | | 180/220 |
| 5,546,678 A | 8/1996 | Dhaemers | |
| 5,713,139 A | 2/1998 | Briggs | |
| 5,784,798 A | 7/1998 | Taylor | |
| 5,875,562 A | 3/1999 | Fogarty | |
| 5,974,680 A | 11/1999 | Anderson et al. | |
| 6,021,993 A * | 2/2000 | Kirkwood | H02K 5/24 |
| | | | 248/634 |
| 6,717,299 B2 * | 4/2004 | Bacile | H02K 5/24 |
| | | | 310/51 |
| 7,152,695 B2 * | 12/2006 | Happ | B25F 5/006 |
| | | | 173/162.1 |
| 7,836,607 B2 | 11/2010 | Kim | |
| 9,057,560 B2 * | 6/2015 | Dyson | F26B 21/004 |
| 9,144,286 B2 * | 9/2015 | Courtney | A45D 20/00 |
| 9,173,468 B2 * | 11/2015 | Moloney | A45D 20/10 |
| 9,282,799 B2 * | 3/2016 | Courtney | A45D 20/12 |
| 9,282,800 B2 * | 3/2016 | Courtney | A45D 20/04 |
| 9,414,662 B2 * | 8/2016 | Moloney | A45D 20/10 |
| 9,420,864 B2 * | 8/2016 | Gammack | A45D 20/08 |
| 9,420,865 B2 * | 8/2016 | Gammack | A45D 20/08 |
| 9,512,959 B2 * | 12/2016 | Atkinson | H02K 5/24 |
| 9,526,310 B2 * | 12/2016 | Courtney | A45D 20/12 |
| 2006/0075654 A1 | 4/2006 | Lin | |
| 2007/0068034 A1 | 3/2007 | Kim | |
| 2007/0080593 A1 * | 4/2007 | O'Donnell | H02K 5/1672 |
| | | | 310/90 |
| 2010/0008655 A1 | 1/2010 | Tackitt et al. | |
| 2010/0064542 A1 | 3/2010 | Mulvaney et al. | |
| 2011/0309068 A1 | 12/2011 | Chen | |
| 2014/0035413 A1 * | 2/2014 | Cowdry | H02K 5/24 |
| | | | 310/91 |
| 2014/0325789 A1 | 11/2014 | Hill et al. | |
| 2014/0328670 A1 * | 11/2014 | Lamb | F04D 29/668 |
| | | | 415/119 |
| 2015/0020401 A1 | 1/2015 | Atkinson | |
| 2015/0021314 A1 | 1/2015 | Coulton et al. | |
| 2016/0206074 A1 * | 7/2016 | Douglas | A45D 20/12 |
| 2017/0112258 A1 | 4/2017 | Blanc et al. | |

FOREIGN PATENT DOCUMENTS

| | | | |
|---|---|---|---|
| EP | 2 693 610 | 2/2014 | |
| EP | 3 022 831 | 1/2015 | |
| FR | 1.255.721 | 3/1961 | |
| GB | 953057 | 3/1964 | |
| GB | 2 034 560 | 6/1980 | |
| GB | 2500798 | 10/2013 | |
| GB | 2506654 | 4/2014 | |
| GB | 2513361 | 10/2014 | |
| GB | 2513661 | 11/2014 | |
| GB | 2513662 | 11/2014 | |
| GB | 2515812 | 1/2015 | |
| GB | 2516311 | 1/2015 | |
| GB | 2533324 | 6/2016 | |
| GB | 2534176 | * 7/2016 | |
| JP | 40-36100 | 12/1965 | |
| JP | 48-13744 | 4/1973 | |
| JP | 50-152873 | 12/1975 | |
| JP | 51-69711 | 6/1976 | |
| JP | 54-84507 | 6/1979 | |
| JP | 54-95813 | 7/1979 | |
| JP | 64-83205 | 3/1989 | |
| JP | 2012-45178 | 3/2012 | |
| JP | 2016135096 A | * 7/2016 | A45D 20/12 |
| WO | WO-2015/008025 | 1/2015 | |

OTHER PUBLICATIONS

International Search Report and Written Opinion dated Feb. 2, 2016, directed to International Application No. PCT/GB2015/053577; 14 pages.

Atkinson, U.S. Office Action dated Feb. 22, 2016, directed to U.S. Appl. No. 14/331,747; 8 pages.

* cited by examiner

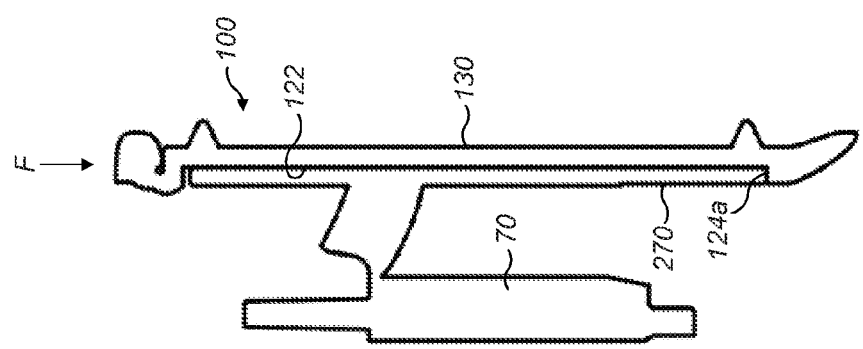
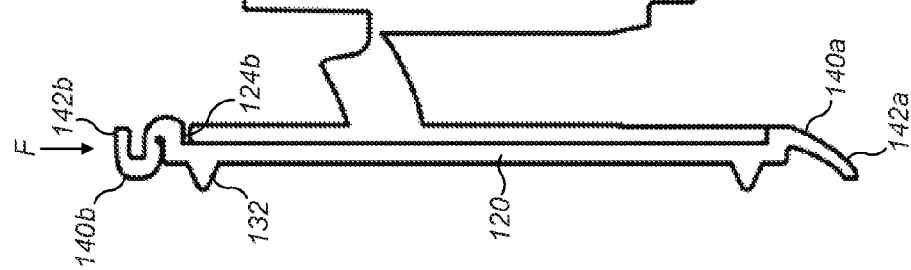
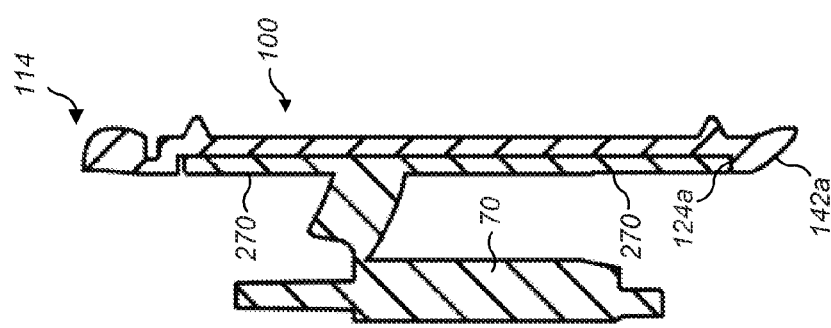
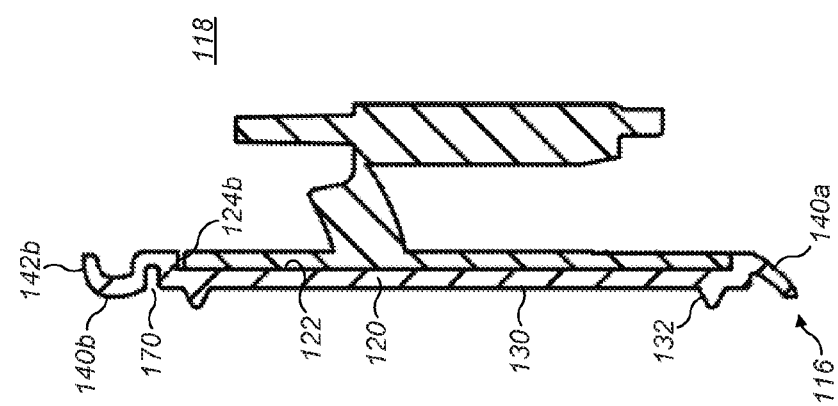

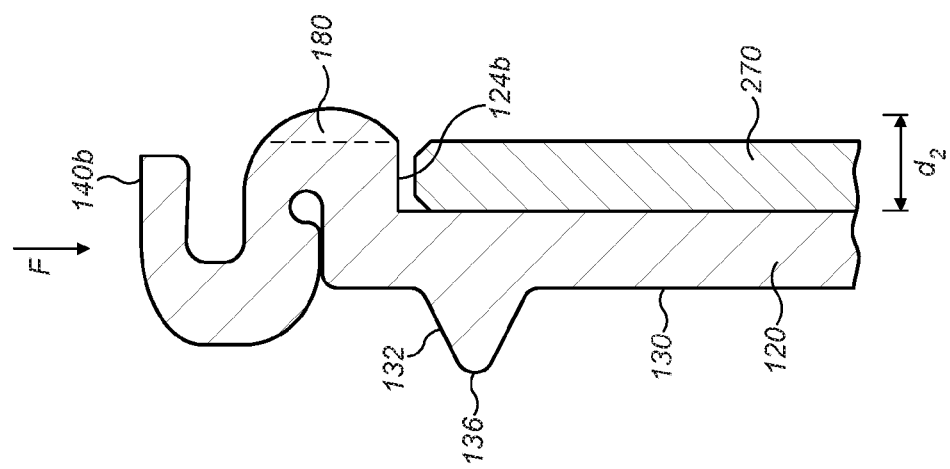
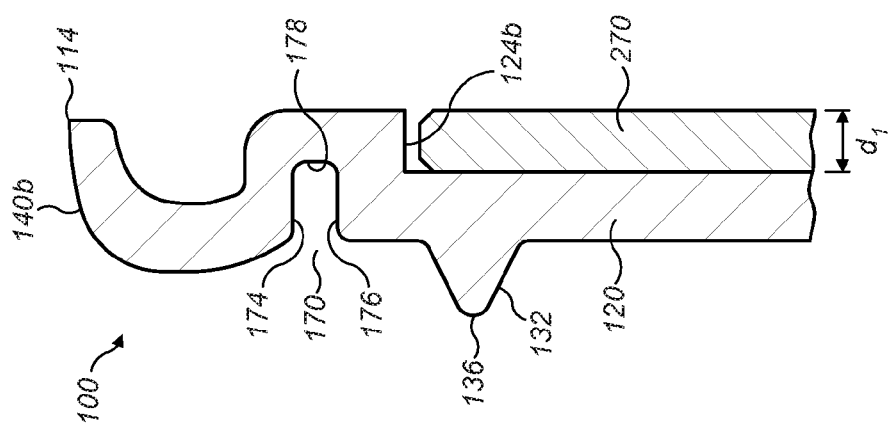

MOTOR MOUNT

REFERENCE TO RELATED APPLICATIONS

This application claims the priority of United Kingdom Application No. 1500656.2, filed Jan. 15, 2015, the entire contents of which are incorporated herein by reference.

FIELD OF THE INVENTION

This invention relates to a mount for a motor, preferably an electric motor.

BACKGROUND OF THE INVENTION

Electric motors are becoming increasingly sophisticated and modern designs are capable of ever higher rotational speeds. One such design of electric motor is a brushless DC motor as used by the applicant in its range of handheld vacuum cleaners and which is capable of being driven at rotational speeds in the region of 100 Krpm.

The use of high speed motors in fluid-moving applications such as vacuum cleaners, fans and hair care appliances is technically attractive since a fan unit equipped with a physically small motor can nonetheless produce very high fluid flow rates.

However, particularly in the case of hand held appliances, the motor can form a significant part of the weight of the appliance and if that appliance is dropped the motor must be protected from damage and dislocation from its' housing.

SUMMARY OF THE INVENTION

The invention provides a mount for an electric motor, the mount comprising a sleeve for receiving a motor, the sleeve including an annular seal extending around the sleeve and a recess extending around the circumference of the sleeve.

Preferably, the sleeve has a first end and a second end. Preferably, the recess is disposed adjacent the first end of the sleeve. It is preferred that the annular seal is disposed at the first end and the recess is next to the annular seal.

Preferably, the first end is a downstream end of the mount.

It is preferred that the recess is an indentation extending circumferentially around the sleeve.

Preferably, the recess is provided on a radially outer surface of the sleeve.

It is preferred that the recess comprises first and second radial surfaces which are spaced apart when in an uncompressed state. Preferably, the first and second surfaces are pressed together when in a compressed state.

Each of a plurality of elements and/or each bellow seal is a resilient support for a fan unit housed within the mount which is compressible.

Preferably, the plurality of elements is provided solely on the radially outer surface of the sleeve. Preferably, a radially inner surface of the sleeve is smooth. It is believed that the most benefit is to be obtained from configuring the sleeve so that the elements/studs project only from the outer surface of the sleeve, whilst the inner surface is smooth so as to contact uniformly with the underlying casing of a motor within the sleeve. However, the invention does not exclude features such as mounting lugs, or even point studs being formed either solely on the inner surface of the sleeve, or even in combination with studs on the outer surface of the sleeve.

Alternatively, at least some of the elements are provided on the radially outer surface of the sleeve, and wherein at least some of the elements are provided on a radially inner surface of the sleeve.

Preferably, the sleeve is formed of a polymeric material. Beneficial results are achieved when the motor mount is formed from a polymeric material, and the currently preferred material is polyurethane rubber. Preferably, the material used has a shore hardness of around 20.

Also disclosed is a hair care appliance comprising a casing having a fluid inlet, a fluid outlet and an annular seat, a mount for an electric motor supported by the annular seat, the motor mount comprising a sleeve for receiving a motor, the sleeve including an annular seal extending around the sleeve in sealing engagement with the annular seat sleeve and a recess extending around the circumference of the sleeve.

Preferably, the appliance comprises a body which houses a heater and a handle which includes the casing.

In a preferred embodiment the appliance comprises a fluid flow path extending from a fluid inlet into the casing to a fluid outlet in the body.

Preferably, the recess is provided at a downstream end of the motor mount.

Preferably, the sleeve has a first end and a second end. It is preferred that the recess is disposed adjacent the first end of the sleeve. Preferably, the annular seal is disposed at the first end and the recess is next to the annular seal.

Preferably, the first end is a downstream end of the mount.

It is preferred that the recess is an indentation extending circumferentially around the sleeve.

Preferably, the recess is provided on a radially outer surface of the sleeve.

It is preferred that the recess comprises first and second radial surfaces which are spaced apart when in an uncompressed state. Preferably, the first and second surfaces are pressed together when in a compressed state.

Each of a plurality of elements and/or each bellow seal is a resilient support for a fan unit housed within the mount which is compressible.

Preferably, the appliance comprises a motor located within the sleeve. In a preferred embodiment, the appliance includes a motor and impeller located within the sleeve. Alternatively, the impeller is located external to the sleeve.

It is preferred that a fluid flow path is provided between the fluid inlet and fluid outlet and through the sleeve. The annular seal of the motor mount seals the fluid flow path with respect to the casing preventing flow recirculating around the motor mount which reduces efficiency.

The casing includes an annular seat which preferably comprises a seal engaging surface, for example a flange, which preferably extends radially inwardly from an inner wall of the casing and generally perpendicular to the inner wall, and which is in sealing engagement with the annular seal.

BRIEF DESCRIPTION OF THE DRAWINGS

The invention will now be described, by way of example only, with reference to the accompanying drawings, in which:

FIG. 4a shows a cross section of the motor mount in an uncompressed state;

FIG. 4b shows a cross section of the motor mount in a compressed state;

FIG. 5a is an expanded view of a portion of the motor mount in an uncompressed state; and FIG. 5b is an expanded view of a portion of the motor mount in a compressed state.

DETAILED DESCRIPTION OF THE INVENTION

Figure 1:
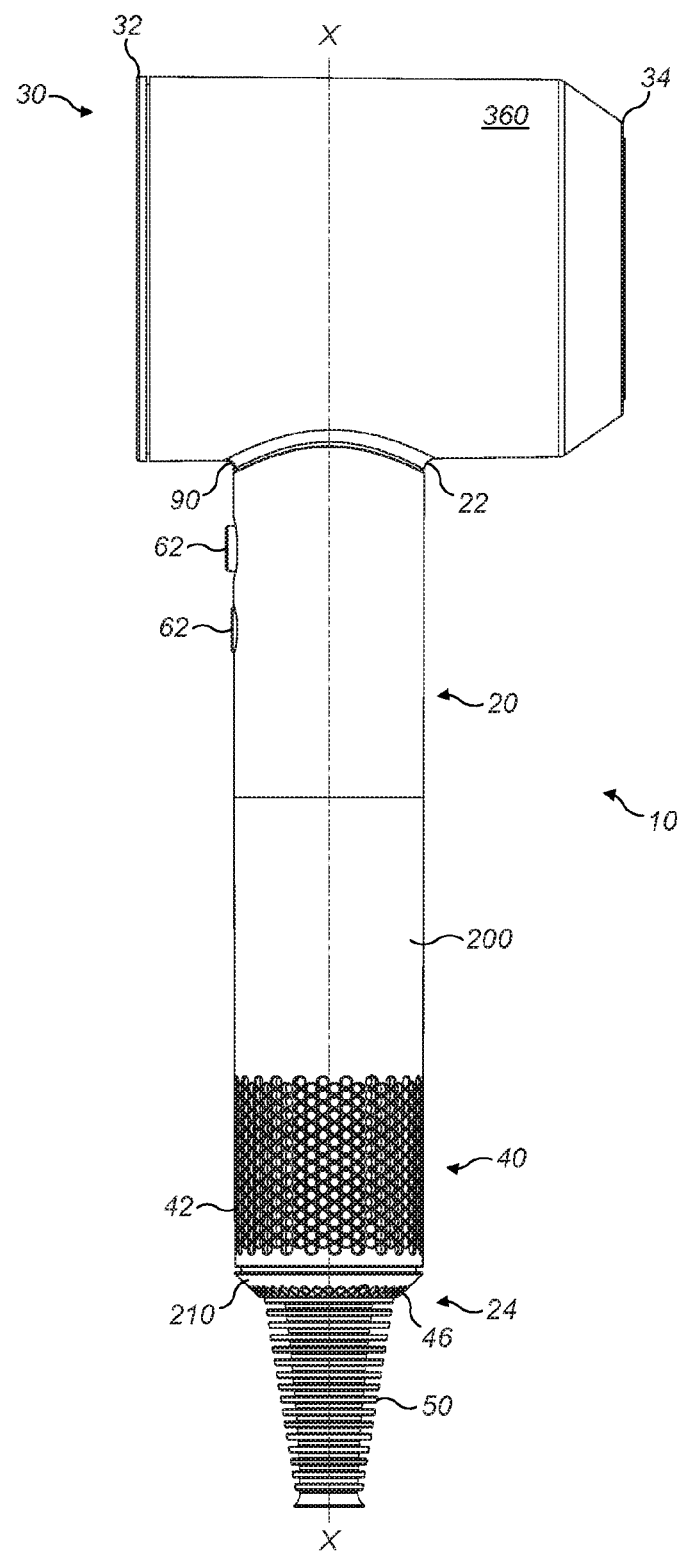
FIG. 1 shows a hairdryer in which a motor mount according to the invention may be used.
Figure 2:
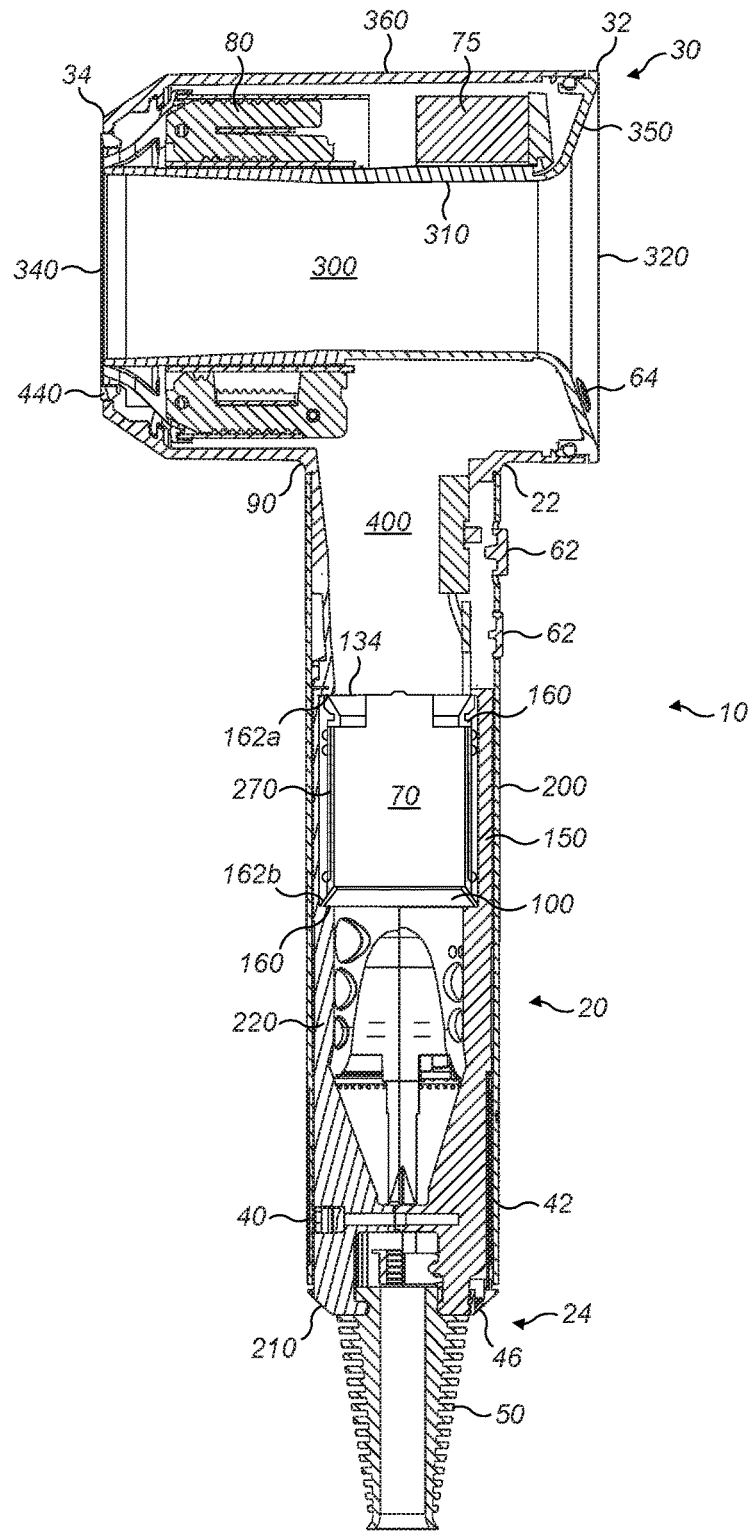
FIG. 2 shows a cross section through the hairdryer of FIG. 1.
Figure 3:
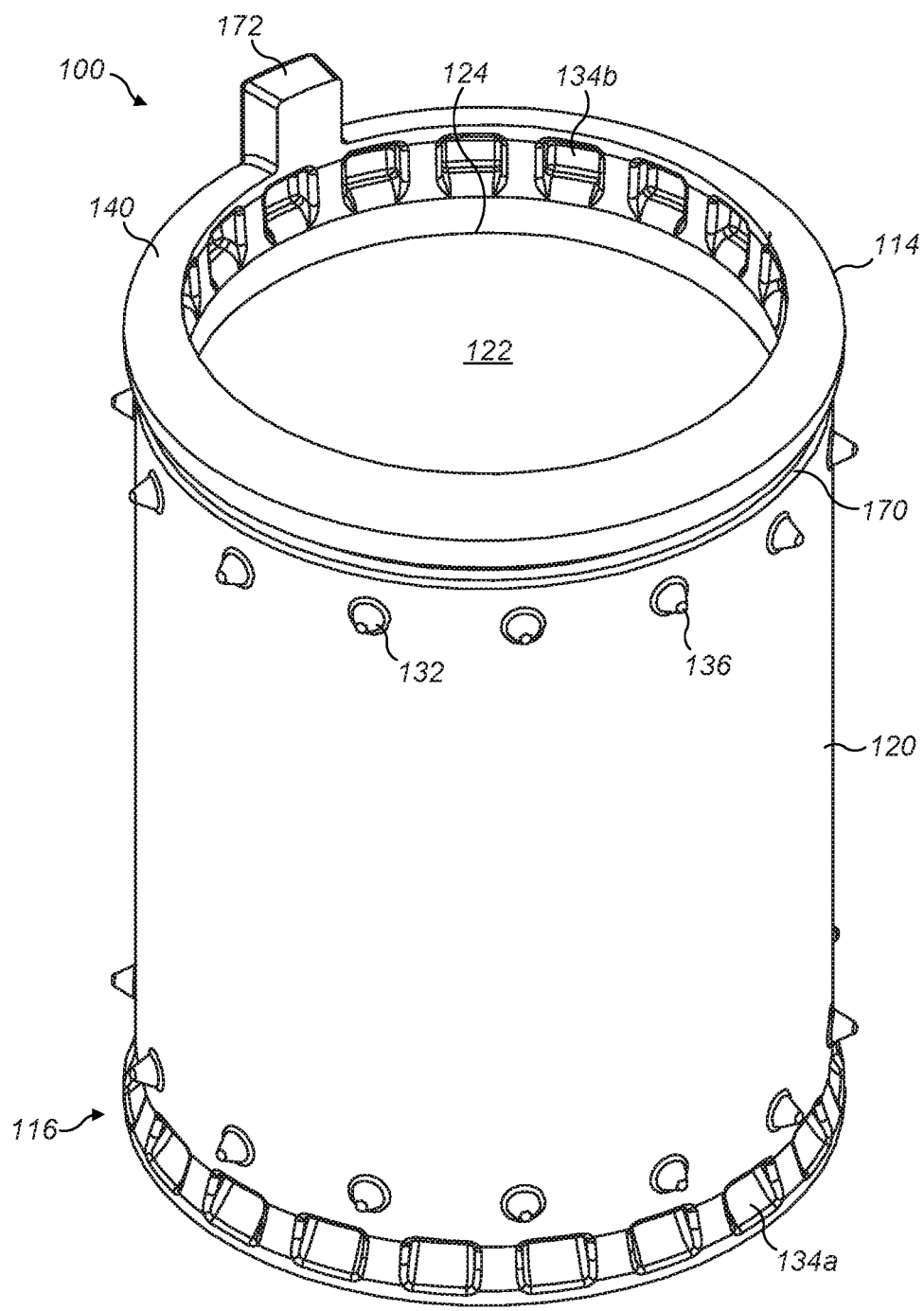
FIG. 3 shows an isometric view of a motor mount according to the invention.

FIGS. 1 and 2 show a hairdryer 10 with a handle 20 and a body 30. The handle has a first end 22 which is connected to the body 30 and a second end 24 distal from the body 30 and which includes a primary fluid inlet 40. Power is supplied to the hairdryer 10 via a cable 50. At a distal end of the cable 50 from the hairdryer 10 a plug (not shown) is provided, the plug may provide electrical connection to mains power or to a battery pack for example.

The handle 20 has an outer wall 200 which extends from the body 30 to a distal end 24 of the handle. At the distal end 24 of the handle an end wall 210 extends across the outer wall 200. The cable 50 enters the hairdryer through this end wall 210. The primary fluid inlet 40 in the handle 20 includes first apertures that extend around and along 42 the outer wall 200 of the handle and second apertures that extend across 46 and through the end wall 210 of the handle 20. The cable 50 is located approximately in the middle of the end wall 210 so extends from the centre of the handle 20. The handle 20 has a longitudinal axis X-X along which the outer wall 200 extends from the body 30 towards the distal end 24.

It is preferred that the cable 50 extends centrally from the handle 20 as this means the hairdryer is balanced regardless of the orientation of the handle 20 in a users' hand. Also, if the user moves the position of their hand on the handle 20 there will be no tugging from the cable 50 as it does not change position with respect to the hand when the hand is moved. If the cable were offset and nearer one side of the handle then the weight distribution of the hairdryer would change with orientation which is distracting for the user.

Upstream of the primary fluid inlet 40, a fan unit 70 is provided. The fan unit 70 includes a fan and a motor. The fan unit 70 is housed within a motor mount 100. The fan unit 70 draws fluid through the primary fluid inlet 40 towards the body 30 through a primary fluid flow path 400 that extends from the primary fluid inlet 40 and into the body 30 where the handle 20 and the body 30 are joined 90. The body 30 has a first end 32 and a second end 34, the primary fluid flow path 400 continues through the body 30 towards the second end 34 of the body, around a heater 80 and to a primary fluid outlet 440 where fluid that is drawn in by the fan unit exits the primary fluid flow path 400. The primary fluid flow path 400 is non linear and flows through the handle 20 in a first direction and through the body 30 in a second direction which is orthogonal to the first direction.

The body 30 includes an outer wall 360 and an inner duct 310. The primary fluid flow path 400 extends along the body from the junction 90 of the handle 20 and the body 30 between the outer wall 360 and the inner duct 310 towards the primary fluid outlet 440 at the second end 34 of the body 30.

Another fluid flow path is provided within the body; this flow is not directly processed by the fan unit or the heater but is drawn into the hairdryer by the action of the fan unit producing the primary flow through the hairdryer. This fluid flow is entrained into the hairdryer by the fluid flowing through the primary fluid flow path 400.

The first end 32 of the body includes a fluid inlet 320 and the second end 34 of the body includes a fluid outlet 340. Both the fluid inlet 320 and the fluid outlet 340 are at least partially defined by the inner duct 310 which is an inner wall of the body 30 and extends within and along the body. A fluid flow path 300 extends within the inner duct 310 from the fluid inlet 320 to the fluid outlet 340. At the first end 32 of the body 30, a side wall 350 extends between the outer wall 360 and the inner duct 310. This side wall 350 at least partially defines the fluid inlet 320. The primary fluid outlet 440 is annular and surrounds the fluid flow path.

A PCB 75 including the control electronics for the hairdryer is located in the body 30 near the side wall 350 and fluid inlet 320. The PCB 75 is ring shaped and extends round the inner duct 310 between the inner duct 310 and the outer wall 360. The PCB 75 is in fluid communication with the primary fluid flow path 400. The PCB 75 extends about the fluid flow path 300 and is isolated from the fluid flow path 300 by the inner duct 310.

The PCB 75 controls parameters such as the temperature of the heater 80 and the speed of rotation of the fan unit 70. Internal wiring (not shown) electrically connects the PCB 75 to the heater 80 and the fan unit 70 and the cable 50. Control buttons 62, 64 are provided and connected to the PCB 75 to enable a user to select from a range of temperature settings and flow rates for example.

In use, fluid is drawn into the primary fluid flow path 400 by the action of the fan unit 70, is optionally heated by the heater 80 and exits from the primary fluid outlet 440. This processed flow causes fluid to be entrained into the fluid flow path 300 at the fluid inlet 320. The fluid combines with the processed flow at the second end 34 of the body. In the example shown in FIG. 2, the processed flow exits the primary fluid outlet 440 and the hairdryer as an annular flow which surrounds the entrained flow that exits from the hairdryer via the fluid outlet 340. Thus fluid that is processed by the fan unit and heater is augmented by the entrained flow.

Referring now to FIGS. 3 to 5b, the invention will now be described in detail. The motor mount 100 comprises a generally cylindrical sleeve 120 including first and second open ends 114, 116. The diameter of both the first open end 114 and second open end 116 is substantially the same as the diameter of the sleeve 112.

The configuration of the sleeve 112 defines a chamber 118, into which is received a fan unit 70 comprising a motor frame 270, an electric motor and impeller. The fan unit 70 is received within the chamber 118 through an open end 114, 116 of the sleeve 112. Preferably the sleeve 112 is a flexible material such as a polymer so that the sleeve 112 can be pulled over the external surface of the fan unit 70, and stretched if necessary, so that an inner surface 122 of the sleeve 112 forms a tight fit around the fan unit 70, like a sock. A pair of annular internal flanges 124 extends radially inwards from the inner surface 122 of the sleeve. These flanges 124 define the extent of the chamber 118 and are adapted to retain the fan unit 70 in position with respect to the sleeve 112. Note that the inner surface 122 is smooth in this embodiment so as to conform closely to the cylindrical outer profile of the fan unit 70.

It will be appreciated that the fan unit 70 is shown schematically for simplicity and so as not to obfuscate the details of the motor mount 100. The fan unit is not central to the inventive concept and so will not be described in detail. In addition although in this embodiment the whole fan unit 70 is housed within the motor mount 70, that is not essential, the fan may be external to the motor mount 70.

One purpose of the motor mount 100 is to fit around the fan unit 70 and serve as an isolating interface between the external case of the fan unit 70 and an internal surface of an apparatus into which the fan unit is installed. To enhance the isolating characteristics of the motor mount 100, the sleeve 112 is provided with a noise attenuating means. In this embodiment, the noise attenuating means takes the form of a plurality of projecting elements 132, 134 that are spaced around an outer surface 130 of the sleeve wall. Note that only a few of the elements are labelled for clarity.

More specifically, a first type of elements are studs 132 formed as right circular cones, each of which defines a sharp point, also referred to as a vertex 136, that are directed away from the sleeve 112. The studs 132 therefore provide sharp points distributed radially about the surface of the sleeve 112 to serve as an interface with an adjacent housing into which the fan unit 70 and motor mount 100 is installed. FIG. 2 shows the motor mount 100 installed in a casing or housing 150.

A second type of elements is a plurality of compression ribs 134, these are spaced radially around the outer surface 130 of the sleeve 112 and are located in two rows one between a flange 124a and the first end 114 of the sleeve 112 and the other between a flange 124b and the second end 116 of the sleeve 112. Thus, the compression ribs 134 are located axially external to or outside the chamber 118 in which the fan unit 70 is located. The compression ribs 134 provide axial cushioning for the fan unit 70.

At each end 114, 116 of the motor mount 110, an annular seal 140 is provided. The annular seals 140 are bellow seals 140a, 140b which have a number of functions, one of which is to provide a seal between the casing 150 and the motor mount 100, another is to house the compression ribs 134 and a third is to isolate vibration.

The casing 150 includes a pair of annular seats 160 which each extend radially inwards of an inner wall 220 providing a seal engaging surface or flange 162a, 162b for sealing engagement with respective bellow seals 140a, 140b.

In this embodiment, the two bellow seals 140a, 140b are orientated oppositely with respect to the sleeve 112. The bellow seals have been orientated oppositely to take advantage of the pressure difference produced between the inner sleeve surface 122 and the outer sleeve surface 130 when the fan unit 70 is activated. The bellow seals 140a, 140b are self energising seals and when the fan unit 70 is activated the respective sealing surface 142a, 142b of each bellow seal 140a, 140b is pushed against the contacting surface 162a, 162b of a flange 160.

The compression ribs 134 are provided with one row 134a on the external surface 130 of the sleeve 112 and the other row 134b on the internal surface 122 of the sleeve 112 this is because the two bellow seals 140a, 410b are orientated oppositely, with one 140a being convex with respect to the inner surface 122 of the sleeve and the other 140b being concave with respect to the inner surface 122 of the sleeve 112.

The fact that the contacting surface 162a, 162b is a radially disposed surface rather than an axially disposed surface improves vibration isolation. The contacting surfaces 162a, 162b are annular seats located within the main body section 150 formed from flanges 160. On the motor mount 100, flanges 124a, 124b extend radially inwardly from the inner surface 122 of the motor mount 100 so that the contacting surface 162a, 162b of each flange 160 of the casing 150 are substantially orthogonal to the rotational axis of the impeller of the fan unit 120. In addition, the rotational axis of the impeller of the fan unit 70 is substantially co-linear with the longitudinal axis of the casing 150.

The bellow seals 134, are annular seals which are preferably smaller than the inner diameter of the casing 150, so that the bellow seal 140 is spaced from the inner surface 220 of the casing 150 and even when compressed, the bellow seal 140a, 140b is isolated from the inner surface 220 of the casing 150.

The bellow seals 140 and the projecting elements 132, 134 provide a plurality of resilient supports between the motor mount 100 and the inner surface 152 of the casing 150. The resilient supports are provided radially about the motor mount 100 and at or adjacent each end 114, 116 of the motor mount providing axial and radial cushioning for the motor regardless of orientation. This is an important benefit of this type of motor mount 100 as for appliances which are designed to be held and do not have a base surface onto which it is placed when not being held the fan unit requires protection from shocks in all orientations in case of dropping the appliance or knocking it off a surface.

In the hairdryer shown in FIGS. 1 and 2, the two heaviest components are the fan unit 70 and the heater 80, thus if the hairdryer 10 falls it will tend to land on the body 30 first. In order to provide extra protection against the motor frame 270 and fan unit 70 being displaced from the casing 150, a recess 170 is provided around the motor mount 100. The recess 170 is an indentation that extends circumferentially around the sleeve 112. The recess 170 is provided near a downstream end of the motor mount 100.

In order that the recess 170 is positioned correctly within the hairdryer 10, a projecting feature 172 is provided on the motor mount 100. This projecting feature 172 projects upwards from the downstream annular seal 140b and is adapted to engage with a corresponding feature located within the downstream flange or seal engaging surface 162b. This ensures that the motor mount 100 is orientated correctly with a downstream end 114 positioned towards the body 30 and an upstream end 116 positioned towards the fluid inlet 40.

The recess 170 is provided adjacent annular seal 140b near the downstream end 114 of the motor mount 100. When a force F pushes against the downstream end 114 of the motor mount 100, the annular seal 140b compresses (FIGS. 4b and 5b) towards the fan unit 70. The motor mount flanges 124a and 124b which retain the motor frame 270 and fan unit 70 in position within the casing 150 are approximately 0.8 mm in depth ($d_1$) when in an uncompressed state (FIG. 4a). By having the recess 170, the flange 124b bulges radially inwardly when the annular seal 140b is compressed. Referring to FIGS. 5a and 5b, in an uncompressed state (FIG. 5a), the recess 170 is an open gap defined by two radial surfaces 174, 176 and one longitudinal surface 178. The downstream radial surface 174 defines an upstream end of annular seal 140b.

When force F is applied to the downstream end 114 of the motor mount 70 for example when the hairdryer 10 lands on a surface after falling, the recess 170 is squashed and the two radial surfaces 174, 176 are pressed together closing the gap. As the motor mount 100 is flexible, this causes the production of a bulge 180 which extends radially inwards of the motor mount 100 and over the motor frame 270. The distance $d_2$ which comprises the uncompressed flange 124b and the bulge 180 is approximately 1 mm. This increase in the thickness of the motor mount 100 provides increased protection against the motor frame 270 and the fan unit 70 from being displaced out of the motor mount 100 and casing 150 due to momentum of the fan unit 70.

Whilst the recess 170 has been described as being positioned near the downstream end 114 of the motor mount 100, a further recess may be provided downstream of and adjacent the upstream annular seal 140a near the upstream end 116 of the motor mount 100. In this particular embodiment, due to the weight distribution being uneven a further recess does not provide any benefit; however in an appliance having a more balanced weight distribution the further recess may be necessary.

As has been mentioned above, it is preferred that the motor mount is a flexible material polymeric material. In this embodiment, polyurethane rubber is used.

The use of the recess 170 provides a further benefit as it helps to maintain contact between the inner surface 122 of the sleeve 120 and the motor frame 270 when a force is applied to the motor mount 100. Without the recess 170, the force F pushes down on the annular seal 140b and can cause the inner surface 122 of the sleeve 120 to decouple from the motor frame 270 in the vicinity of the motor mount flange 124b resulting in the motor mount flange 124b being pulled radially outwards. Thus instead of the motor mount flange 124b being essentially axially aligned with the motor frame 270, it becomes offset and only covers a part of the thickness of the motor frame 270 which means that there is a higher chance of the motor frame 270 and fan unit 70 becoming displaced with respect to the motor mount 100.

Some variations to the specific embodiment of the illustrative drawings have already been mentioned above. Others will now be explained below.

In the specific embodiment shown the fan unit 70 is equipped with a motor and an impeller to act as a fluid mover, the air flow being depict by way of arrows and both the motor and impeller are housed within the motor mount. Such an arrangement may have particular application to other devices which require high speed air flows, such as vacuum cleaners; other hair care appliances such as traditional hairdryers having fluid flowing through just the body and hot styling brushes; and fans. However, it should be appreciated that the specific embodiment is only exemplary and that the motor mount may house just the motor with the impeller being located externally thereof hence the use of the term motor mount 100 as the mount is applicable to any apparatus in which a motor needs to be installed in a close conforming housing, whether or not the motor is coupled to an impeller.

The cylindrical shape of the sleeve is currently preferred since it functions to envelope the correspondingly shaped outer surface of the motor in an unbroken 'sock' of protecting and isolating material. However, it is also envisaged that benefits would be achieved if the sleeve were part cylindrical so that it does not envelope the entire outer surface of the motor.

Although the outer surface of the motor mount is provided with a plurality of pointed studs, in this embodiment, the inner surface of the motor mount is smooth. Reference to the smoothness of the internal surface of the sleeve is not intended as a precise value of surface roughness, rather that the inner surface should be substantially free from surface aberrations/bumps and projections, so that the inner surface makes uniform contact with the outer periphery of the external case of the motor. Without being bound by theory, it is believed that the smoothness of the inner surface of the sleeve promotes good acoustic contact between the motor and the sleeve.

In the specific embodiment described above the sleeve is cylindrical. However, it should be appreciated that this is not essential to the invention and the sleeve may instead have a different cross sectional profile. Here, the profile is cylindrical so as to match the cylindrical profile of the motor casing since the sleeve should conform to its outer surface. It follows, therefore that the sleeve may have whatever profile is required to mate with an outer casing of a motor, although cylindrical motor casings are most common.

The annular seal described in the specific embodiments is a bellow seal however any arrangement which is capable of both sealing an annulus and is reversibly compressible is applicable as will be apparent to the skilled person.

The invention claimed is:

1. A mount for an electric motor, the mount comprising a sleeve for receiving a motor, the sleeve including an annular seal and a recess extending around the circumference of the sleeve, wherein the mount includes a first set of compression ribs disposed on an internal surface of the sleeve, wherein the mount includes a second set of compression ribs disposed on an external surface of the sleeve, and wherein the first set and second set of compression ribs are located on opposite ends of the sleeve.

2. The mount of claim 1, wherein the sleeve has a first end and a second end.

3. The mount of claim 2, wherein the recess is disposed adjacent the first end of the sleeve.

4. The mount of claim 3, wherein the annular seal is disposed at the first end and the recess is next to the annular seal.

5. The mount of claim 3, wherein the first end is a downstream end of the mount.

6. The mount of claim 1, wherein the recess is an indentation extending circumferentially around the sleeve.

7. The mount of claim 1, wherein the recess is provided on a radially outer surface of the sleeve.

8. The mount of claim 1, wherein the recess comprises first and second radial surfaces which are spaced apart when in an uncompressed state.

9. The mount of claim 8, wherein the first and second surfaces are pressed together when in a compressed state.

10. A hair care appliance comprising:
    a casing having a fluid inlet, a fluid outlet and an annular seat; and
    the mount for an electric motor of claim 1 wherein the mount is supported by the annular seat.

11. A hair care appliance comprising:
    a casing having a fluid inlet, a fluid outlet and an annular seat;
    a mount for an electric motor supported by the annular seat, the motor mount comprising: a sleeve for receiving a motor, the sleeve including an annular seal extending around the sleeve in sealing engagement with the annular seat and a recess extending around the circumference of the sleeve, wherein the mount includes a first set of compression ribs disposed on an internal surface of the sleeve, wherein the mount includes a second set of compression ribs disposed on an external surface of the sleeve, and wherein the first set and second set of compression ribs are located on opposite ends of the sleeve.

12. The appliance of claim 11, wherein the appliance comprises a body which houses a heater and a handle which includes the casing.

13. The appliance of claim 11, wherein the appliance comprises a fluid flow path extending from a fluid inlet into the casing to a fluid outlet in the body.

14. The appliance of claim 11, wherein the recess is provided at a downstream end of the motor mount.

* * * * *